(12) United States Patent
Nomiyama

(10) Patent No.: US 10,557,565 B2
(45) Date of Patent: Feb. 11, 2020

(54) POSITIONER

(71) Applicant: Azbil Corporation, Chiyoda-ku (JP)

(72) Inventor: Takashi Nomiyama, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 134 days.

(21) Appl. No.: 15/466,131

(22) Filed: Mar. 22, 2017

(65) Prior Publication Data

US 2017/0276258 A1 Sep. 28, 2017

(30) Foreign Application Priority Data

Mar. 23, 2016 (JP) .................................. 2016-058384

(51) Int. Cl.
*F16K 37/00* (2006.01)

(52) U.S. Cl.
CPC ...... *F16K 37/0083* (2013.01); *F16K 37/0091* (2013.01)

(58) Field of Classification Search
USPC ........................................................ 73/1.72
See application file for complete search history.

(56) References Cited

U.S. PATENT DOCUMENTS

| 5,406,920 A * | 4/1995 | Murata | F02D 11/10 123/399 |
|---|---|---|---|
| 5,431,182 A * | 7/1995 | Brown | G05B 6/05 137/487.5 |
| 5,558,115 A * | 9/1996 | Lenz | G05D 7/005 137/486 |
| 5,848,609 A * | 12/1998 | Marchesseault | G05B 19/19 137/624.11 |
| 5,884,894 A * | 3/1999 | Smith | F15B 9/09 137/625.64 |
| 5,951,240 A * | 9/1999 | Mirsky | F04D 27/0215 415/1 |

(Continued)

FOREIGN PATENT DOCUMENTS

| JP | 2002-39106 A | 2/2002 |
| JP | 2013-53652 A | 3/2013 |
| WO | WO 2015/171843 A2 | 11/2015 |

OTHER PUBLICATIONS

Japanese Office Action dated Jul. 12, 2019 in Japanese Patent Application No. 2016-058384 (with English abstract), 6 pages.

*Primary Examiner* — Peter J Macchiarolo
*Assistant Examiner* — Mohammed E Keramet-Amircolai
(74) *Attorney, Agent, or Firm* — Oblon, McClelland, Maier & Neustadt, L.L.P.

(57) ABSTRACT

A positioner according to the present invention includes: an electro-pneumatic converter that converts an input electric signal into a pneumatic signal and controls the valve opening of a regulating valve by driving an operational unit in accordance with the pneumatic signal; an operating-point searching unit that changes the electric signal by performing open loop control to search for an operating point indicating a target valve-opening value of the regulating valve when an output air pressure of the pneumatic signal starts to change; and a PST executing unit that executes a PST on the regulating valve by using the operating point found by the operating-point searching unit. The operating-point searching unit sets the operating point based on a value of the electric signal when the output air pressure matches a first reference value.

9 Claims, 13 Drawing Sheets

(56) References Cited

U.S. PATENT DOCUMENTS

| | | | | |
|---|---|---|---|---|
| 6,155,283 | A * | 12/2000 | Hansen | G05B 13/042 |
| | | | | 137/1 |
| 6,267,349 | B1 * | 7/2001 | Gomes | F16K 31/408 |
| | | | | 251/30.04 |
| 6,745,084 | B2 * | 6/2004 | Boger | F15B 5/006 |
| | | | | 700/13 |
| 9,739,682 | B2 * | 8/2017 | Schoonover | G01L 27/005 |
| 9,752,599 | B2 * | 9/2017 | Junk | F16K 37/0075 |
| 2006/0016183 | A1 * | 1/2006 | Hoffmann | F16K 37/0041 |
| | | | | 60/407 |
| 2010/0179699 | A1 * | 7/2010 | Kresse | F15B 19/002 |
| | | | | 700/282 |
| 2011/0048556 | A1 * | 3/2011 | Carter | F16K 31/122 |
| | | | | 137/559 |
| 2013/0103209 | A1 * | 4/2013 | Beck | G05D 7/0635 |
| | | | | 700/282 |
| 2014/0097700 | A1 * | 4/2014 | Law | H02H 3/05 |
| | | | | 307/112 |
| 2014/0100673 | A1 * | 4/2014 | Amirthasamy | F16K 37/0075 |
| | | | | 700/32 |
| 2014/0102549 | A1 * | 4/2014 | Okuda | F15B 5/006 |
| 2014/0303793 | A1 * | 10/2014 | Anderson | F16K 31/1262 |
| | | | | 700/282 |

* cited by examiner

POSITIONER

CROSS-REFERENCE TO RELATED APPLICATIONS

The present application is based on and claims priority to Japanese Application No. 2016-058384, filed Mar. 23, 2016, the entire contents of which are incorporated therein by reference.

BACKGROUND OF THE INVENTION

1. Field of the Invention

The present invention relates to positioners that control the valve openings of regulating valves. For example, the present invention relates to a positioner for an emergency valve that fully opens or closes urgently for security reasons when an abnormality occurs.

2. Description of the Related Art

Known examples of regulating valves used in process control of flow rates in, for example, plants include a regulating valve (so-called control valve) the valve opening of which is controlled by performing proportional-integral-derivative (PID) control such that the pressure of a fluid to be controlled is adjusted to a designated target value, and also include an emergency valve that fully opens or closes urgently for security reasons when an abnormality occurs (see JIS B 0100:2013).

Generally, an emergency valve is fixed in a fully open state or a fully closed state during normal flow control, and fully closes or opens rapidly if an abnormality occurs. In other words, an emergency valve does not operate unless there is an emergency. Therefore, it is necessary to perform a test on a regular basis for checking whether or not the emergency valve operates properly if there is an emergency.

International Publication No. WO 2015/171843 A2 discloses a partial stroke test (PST) as a known test performed on emergency valves. A PST is a method of inspecting whether or not there is a failure caused by fixation of an emergency valve by partially opening or closing the emergency valve instead of wholly operating (fully closing or opening) the valve. With this method, the emergency valve can be inspected without having to shut down the plant.

Generally, the valve opening of a regulating valve, such as a control valve or an emergency valve, is controlled by a positioner. The positioner calculates a deviation between a target valve-opening value designated by a higher-level device and an actually-measured valve-opening value (actual degree of opening) of the regulating valve and supplies a control signal generated based on the deviation to an operational unit for operating the opening and closing of the regulating valve so as to control the valve opening of the regulating valve.

A positioner for a control valve performs feedback control (PID control) so as to keep the valve opening of the control valve constant. In contrast, a positioner for an emergency valve performs open loop control so as to open and close the valve when an emergency occurs. For example, in the case of a positioner for an emergency shutoff valve, the positioner performs open loop control to set the target valve-opening value to 100% and fully open the valve during normal operation, and to change the target valve-opening value from 100% to 0% and rapidly close the valve when an emergency occurs. If a PST is to be performed, the valve opening is controlled by performing feedback control (PID control) even in the case of a positioner for an emergency shutoff valve.

A positioner is equipped with an electro-pneumatic converter (I/P converter) including a nozzle flapper that converts an electric signal MV based on a set valve-opening value designated by a higher-level device into a pneumatic signal (pressure Pn) and a pilot relay unit that generates an output pneumatic signal (output air pressure Po) by amplifying the pressure of the pneumatic signal output from the nozzle flapper. In the electro-pneumatic converter, the pilot relay unit has a small deviation from a designed value of the input-output characteristic (Pn-Po characteristic) due to, for example, aging degradation or a temperature change, whereas the nozzle flapper has a large deviation from a designed value of the input-output characteristic (MV-Pn characteristic) due to, for example, aging degradation, the ambient temperature, or clogging of the nozzle outlet. Thus, the input-output characteristic (MV-Po characteristic) of the entire electro-pneumatic converter changes significantly due to, for example, aging degradation. This results in a significant change in the input value (electric signal MV) to the electro-pneumatic converter when the pressure (output air pressure Po) of the pneumatic signal to be output from the electro-pneumatic converter starts to change from the maximum value (or the minimum value).

The input value (electric signal MV) to the electro-pneumatic converter when the output air pressure Po of the electro-pneumatic converter starts to change from the maximum or minimum state will be referred to as "operating point" hereinafter.

In the case of a control valve, since the positioner performs PID control so as to match the actually-measured valve-opening value with the target value, as described above, the above-described problem with regard to fluctuations in the operating point does not occur.

In the case of an emergency valve, since the positioner performs open loop control to control the valve opening, if the operating point fluctuates, there is a possibility that the emergency valve may malfunction during normal operation. Therefore, emergency valves are designed in view of a sufficient margin for preventing them from malfunctioning even if the operating point fluctuates. For example, emergency shutoff valves are designed such that the output air pressure is at maximum (i.e., actual degree of opening of 100%) when the input (electric signal MV) to the electro-pneumatic converter is 60% or higher even if the input to the electro-pneumatic converter is not 100%, as shown in FIG. 13.

SUMMARY OF THE INVENTION

However, it has been clarified from studies by the present inventors of this application that, even if emergency valves are designed in view of the above-mentioned margin, the fluctuations in the operating point are still problematic when performing the PST. This will be described in detail below.

For example, it is assumed that the PST is performed on an emergency shutoff valve by using a positioner having the input-output characteristic as shown in FIG. 13 so as to reduce the actual degree of opening of the emergency shutoff valve to 90%.

For example, in a case where an initial value of the input (electric signal MV) to the electro-pneumatic converter when executing the PST is set to a designed operating-point value (i.e., the input to the electro-pneumatic converter is 60%), if the operating point does not change from the designed value, the output air pressure Po of the emergency shutoff valve slightly decreases from the maximum value, and the actual degree of opening of the emergency shutoff valve slightly decreases from 100%, as shown in FIG. 13. In contrast, if the operating point when executing the PST is higher than the designed value, the output air pressure Po of the emergency shutoff valve rapidly changes from the maximum value (i.e., actual degree of opening of 100%) to the minimum value (i.e., actual degree of opening of 0%), as shown in FIG. 14, which is extremely dangerous.

On the other hand, if the PST is commenced such that the initial value of the input (electric signal MV) to the electro-pneumatic converter starts from 100%, that is, the output air pressure Po definitely starts from the maximum value (or the minimum value), in view of the fact that the operating point is changing, this is not practical since there is a possibility that it may take an extremely long period of time for the integral value of the feedback control (PID control) to reach the operating point. This is because an optimal PID control parameter for the lighting operation in the PST is assumed based on a state where the integral value is constantly near the operating point and is not suitable for the integral value to reach an unknown operating point in accordance with open loop control. Normally, it is extremely difficult to perform PID tuning that simultaneously satisfies both of these conditions.

Accordingly, the present inventors of this application have found that there is a problem in emergency valves in that a safe and efficient PST cannot be performed since the amount of deviation from the designed operating-point value is not clear.

The present invention has been made in view of the above-mentioned problem, and an object thereof is to provide a positioner that enables a safe and efficient PST of a regulating valve.

A positioner (100, 100A, 100B) according to the present invention includes: an electro-pneumatic converter (11) that converts an input electric signal (MV) into a pneumatic signal (Po, Po1, Po2) and controls a valve opening of a regulating valve (3) by driving an operational unit (2, 2B) in accordance with the pneumatic signal; an operating-point searching unit (20) that changes the electric signal by performing open loop control so as to search for an operating point indicating an input value (electric signal MV) of the electro-pneumatic converter when an output air pressure of the pneumatic signal starts to change; and a partial-stroke-test executing unit (30) that executes a partial stroke test on the regulating valve by using the operating point found by the operating-point searching unit. The operating-point searching unit sets the operating point based on a value of the electric signal when the output air pressure matches a first reference value (Po_th, d_th).

In the above positioner, the operating-point searching unit may change the electric signal at a fixed rate of change.

In the above positioner, the operating-point searching unit may gradually decrease a rate of change of the electric signal.

In the above positioner, the electro-pneumatic converter may include a nozzle flapper (12), and the operating-point searching unit may change the electric signal at a first rate of change and then change the electric signal at a second rate of change, which is smaller than the first rate of change, when a nozzle back pressure (Pn) of the nozzle flapper matches a second reference value.

The above positioner may further include a first pressure sensor (15, 15_1, 15_2) that detects the output air pressure. The operating-point searching unit may include an electric-signal generating unit (21) that generates the electric signal, a first determining unit (23) that determines whether or not the output air pressure matches the first reference value (Po_th, d_th), and an operating-point setting unit (22) that sets the operating point based on a current value of the electric signal when the first determining unit determines that the output air pressure matches the first reference value.

The above positioner may further include a first pressure sensor (15, 15_1, 15_2) that detects the output air pressure and a second pressure sensor (14) that detects the nozzle back pressure. The operating-point searching unit may include an electric-signal generating unit (21) that generates the electric signal, a first determining unit (23) that determines whether or not the output air pressure detected by the first pressure sensor matches the first reference value (Po_th, d_th), a second determining unit (24) that determines whether or not the nozzle back pressure detected by the second pressure sensor matches the second reference value (Pn_th, r_th), and an operating-point setting unit (22) that sets the operating point based on a current value of the electric signal when the first determining unit determines that the output air pressure matches the first reference value. The electric-signal generating unit may change the electric signal at the second rate of change if the second determining unit determines that the nozzle back pressure matches the second reference value when the electric signal is changed at the first rate of change.

In the above positioner, the electro-pneumatic converter may generate a pair of pneumatic signals (So1, So2) for driving the operational unit (2B) for double action. The first pressure sensor may detect air pressures (Po1, Po2) of the pair of pneumatic signals. The operating-point searching unit may further include a pressure difference calculator (25) that calculates a pressure difference of the pair of pneumatic signals detected by the first pressure sensor. The first determining unit may receive the pressure difference calculated by the pressure difference calculator as the output air pressure.

In the above description, the reference signs in the drawings that correspond to the components of the present invention are indicated in parentheses.

Accordingly, the present invention can provide a positioner that enables a safe and efficient PST of a regulating valve.

DESCRIPTION OF THE PREFERRED EMBODIMENTS

Embodiments of the present invention will be described below with reference to the drawings.

First Embodiment

Figure 1:
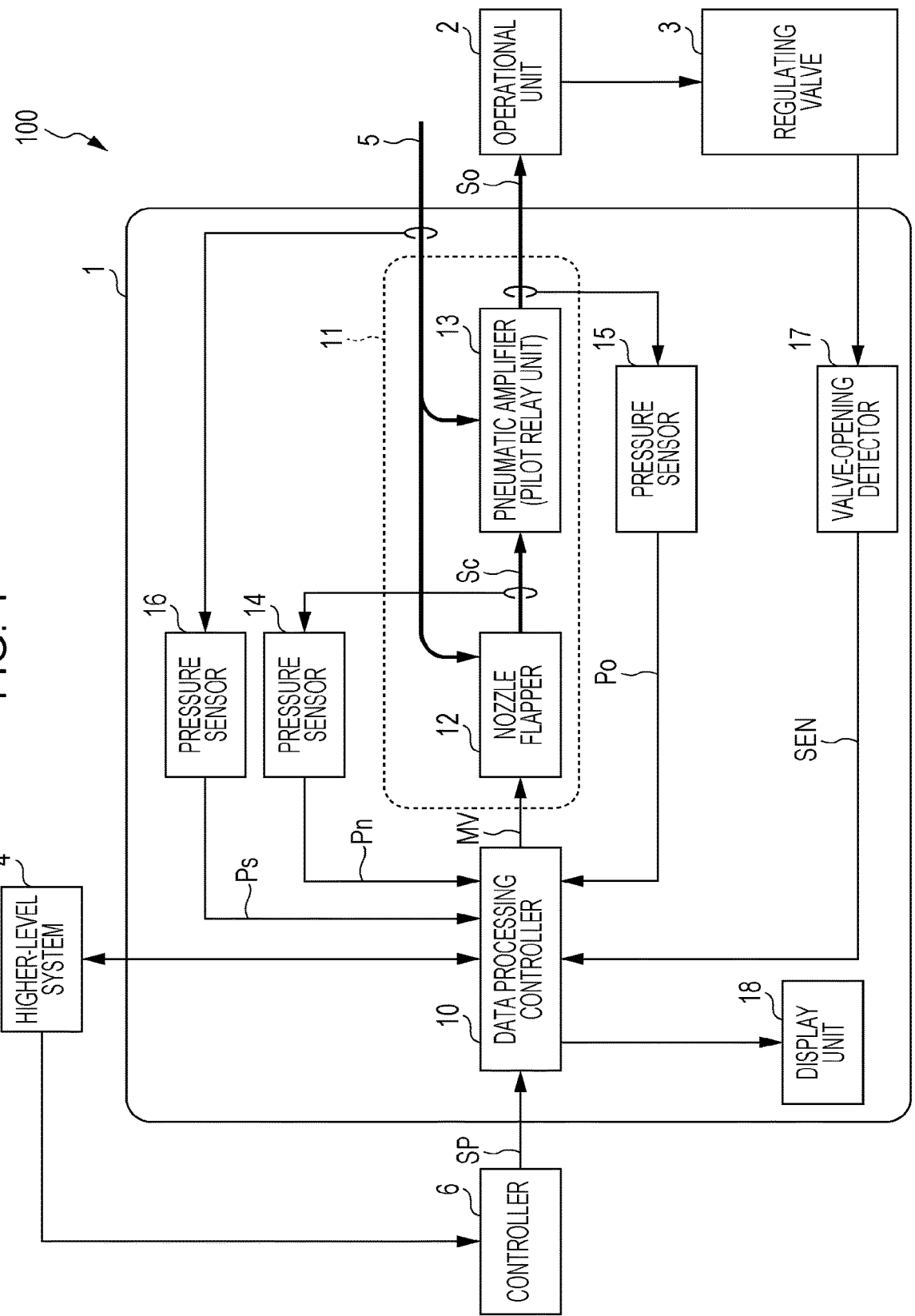
FIG. 1 illustrates the configuration of a valve control system including a positioner according to a first embodiment.

FIG. 1 illustrates the configuration of a valve control system 100 including a positioner 1 according to a first embodiment of the present invention.

The valve control system 100 shown in FIG. 1 includes a regulating valve 3, an operational unit 2, a higher-level system 4, and the positioner 1 and is used in, for example, a flow control process in a plant.

The regulating valve 3 controls the flow of a fluid from one flow channel to another and is, for example, a pneumatic regulating valve. In this embodiment, the regulating valve 3 is described as being an emergency shutoff valve as an example.

The operational unit 2 is, for example, a pneumatic valve actuator and controls the opening-closing operation of the regulating valve 3 by operating a valve shaft of the regulating valve 3 in accordance with an output pneumatic signal So supplied from the positioner 1, which will be described later. In this embodiment, the operational unit 2 is described as being a single-action operational unit having a structure that sets the operational amount of the valve shaft of the regulating valve 3 in accordance with the pressure of the received output pneumatic signal So.

The higher-level system 4 performs overall management of the valve control system 100 including the positioner 1 and is, for example, a distributed control system (DCS). For example, the higher-level system 4 commands the positioner 1 to execute various types of tests, including a partial stroke test (PST), on a regular basis or in accordance with user operation.

A controller 6 commands the positioner 1 to open and close the regulating valve 3 in accordance with, for example, a command from the higher-level system 4. Specifically, for example, the controller 6 sends a set valve-opening value SP (e.g., SP=100%) for the regulating valve 3 to the positioner 1 so that the regulating valve 3 becomes fully open when the valve control system 100 is performing normal operation, and sends a set valve-opening value SP (e.g., SP=0%) of the regulating valve 3 to the positioner 1 so that the regulating valve 3 becomes fully closed when some kind of abnormality occurs.

Based on the set valve-opening value SP of the regulating valve 3 sent from the controller 6 and the test (PST) execution command from the higher-level system 4, the positioner 1 controls the opening and closing of the regulating valve 3.

A detailed configuration of the positioner 1 will be described below. In this embodiment, functional units for executing the PST in the positioner 1 will be described, whereas descriptions of functional units for realizing other functions will be omitted.

As shown in FIG. 1, the positioner 1 includes functional units, such as a valve-opening detector 17, a data processing controller 10, an electro-pneumatic converter 11, a plurality of pressure sensors 14 to 16, and a display unit 18. These functional units are accommodated inside, for example, a housing composed of a metallic material that is corrosion resistant against the fluid to be controlled by the regulating valve 3.

The valve-opening detector 17 is a displacement-amount detector that detects the valve opening of the regulating valve 3 as a displacement amount of the valve shaft and generates a detection signal SEN in accordance with the displacement amount. The valve-opening detector 17 may be, for example, an angle sensor or a magnetic sensor.

The data processing controller 10 is an electronic circuit that performs overall control of the positioner 1 and that also generates an electric signal MV for designating the operational amount of the regulating valve 3. Specifically, during the normal operation mode and the emergency shutoff mode of the valve control system 100, the data processing controller 10 generates an electric signal MV for operating the regulating valve 3 based on the target valve-opening value SP sent from the controller 6 and also performs various types of data processing related to the PST in accordance with the PST execution command from the higher-level system 4 so as to generate an electric signal MV based on the data processing result. A detailed configuration of the data processing controller 10 will be described later.

The electro-pneumatic converter 11 is a pneumatic circuit that converts the electric signal MV generated by the data processing controller 10 into a pneumatic signal. For example, the electro-pneumatic converter 11 is constituted of a nozzle flapper 12 and a pneumatic amplifier 13.

The nozzle flapper 12 changes a pressure Ps (referred to as "supplied air pressure" hereinafter) of air 5 supplied to the positioner 1 from an air-pressure supply source (not shown), such as a pressure reducing valve, provided outside the positioner 1 in accordance with the electric signal MV so as to generate a pneumatic signal Sc according to the electric signal MV.

For example, the nozzle flapper 12 is constituted of a nozzle, one end of which is supplied with the air 5 with the supplied air pressure Ps via a fixed aperture and the other end of which outputs the pneumatic signal Sc therefrom, a coil that changes the magnetic field in accordance with the electric signal MV, and a flapper that swivels in accordance with the change in the magnetic field by the coil so as to change the pressure of the pneumatic signal Sc output from the nozzle. The pressure Pn of the pneumatic signal Sc will be referred to as "nozzle back pressure Pn" hereinafter.

The pneumatic amplifier 13 is a functional unit that amplifies the pneumatic signal Sc generated by the nozzle flapper 12 so as to generate an output pneumatic signal So for driving the operational unit 2. For example, the pneumatic amplifier 13 is a well-known single-action pilot relay unit or a pilot unit having a function for switching between single action and double action, and regulates the air 5 with the supplied air pressure Ps in accordance with the pressure Pn of the pneumatic signal Sc output from the nozzle flapper 12 so as to generate the output pneumatic signal So.

The pressure sensors 14 to 16 are components for measuring various kinds of air pressures in the positioner 1. Specifically, the pressure sensor 14 detects the nozzle back pressure Pn of the pneumatic signal Sc, the pressure sensor 15 detects an output air pressure Po of the output pneumatic signal So, and the pressure sensor 16 detects the supplied air pressure Ps of the air 5.

The display unit 18 is a functional unit that is controlled by, for example, the data processing controller 10 and that displays various types of information. The display unit 18 may be, for example, a liquid crystal display. The display unit 18 displays, for example, a PST execution result so as to present necessary information to the user.

Next, a detailed configuration of the data processing controller 10 will be described.

Figure 2:
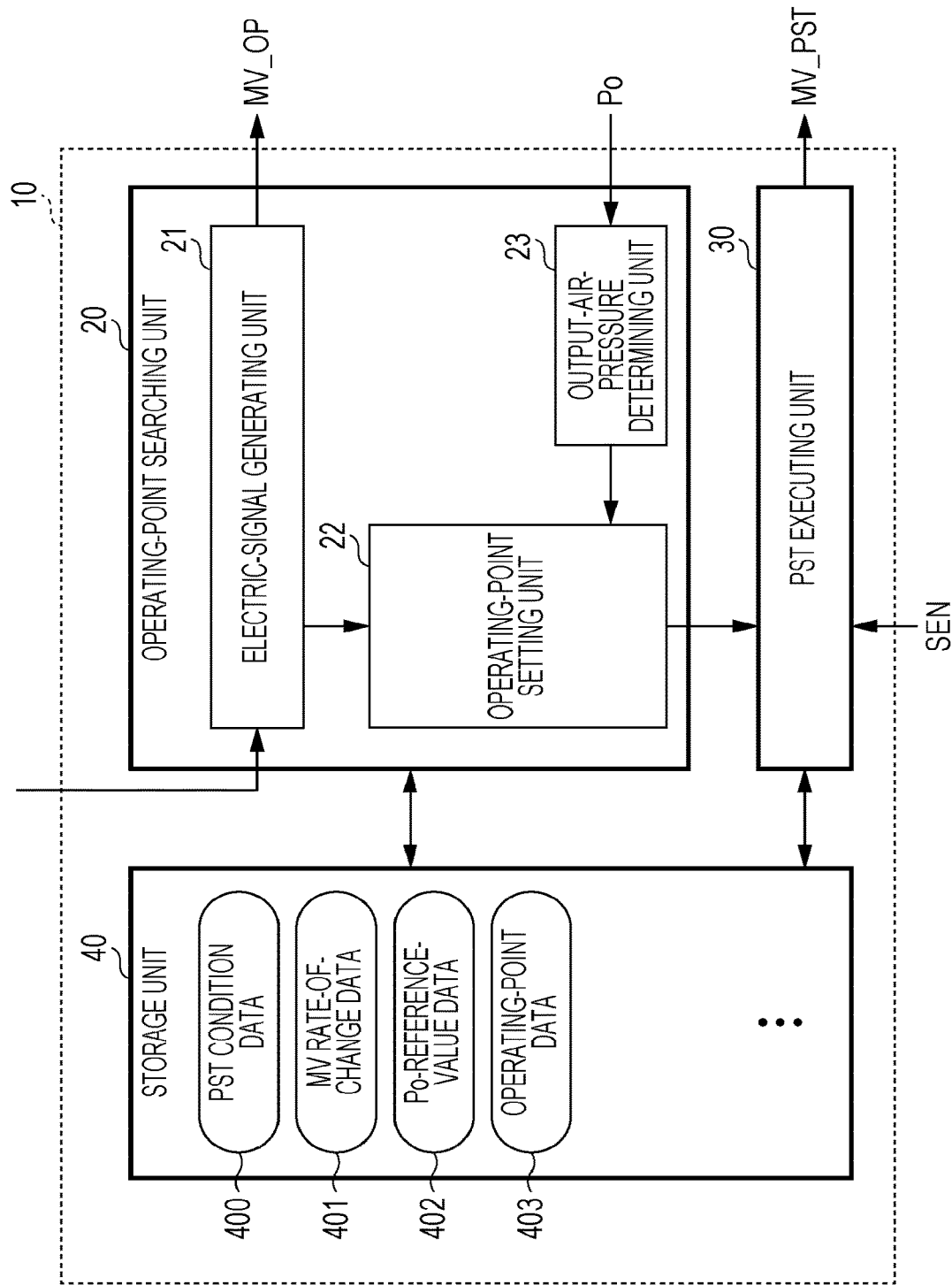
FIG. 2 illustrates the configuration of a data processing controller of the positioner according to the first embodiment.

FIG. 2 illustrates the configuration of the data processing controller 10 of the positioner 1 according to the first embodiment.

The data processing controller 10 is realized by electronic circuits (hardware resources) including: a program processing device such as a micro controller (MCU) equipped with a central processing unit (CPU) and various types of memory devices, such as a random access memory (RAM) and a read-only memory (ROM); various types of interface circuits for realizing input and output of signals from and to external devices; an analog-digital (A/D) converter circuit for converting various types of analog signals input from external devices into digital signals and inputting the digital signals to the program processing device; and a digital-analog (D/A) converter circuit for converting a digital signal based on a data processing result obtained by the program processing device into an analog signal of 4 mA to 20 mA.

In detail, as shown in FIG. 2, the data processing controller 10 includes a PST executing unit 30, an operating-point searching unit 20, and a storage unit 40. The PST executing unit 30, the operating-point searching unit 20, and the storage unit 40 are realized by the above-mentioned hardware resources and by a program (software) that realizes various types of functions by working in cooperation with the above-mentioned hardware resources.

Of the various types of functional units constituting the data processing controller 10, only the functional units for realizing the above-mentioned PST are illustrated in FIG. 2, and the remaining functional units for realizing other functions are not illustrated. Furthermore, in FIG. 2, as electric signals MV output from the data processing controller 10, an electric signal output from the PST executing unit 30 is denoted as "MV_PST" and an electric signal output from the operating-point searching unit 20 is denoted as "MV_OP".

The PST executing unit 30 is a functional unit for executing the PST. The PST executing unit 30 uses an operating point found by the operating-point searching unit 20, which will be described later, so as to execute the PST by operating the regulating valve 3 in accordance with PST condition data 400 stored in the storage unit 40, which will be described later. In the following description, it is assumed that the PST executing unit 30 executes the PST by changing the set valve-opening value SP based on the PST condition data 400 stored in the storage unit 40 instead of the target valve-opening value SP sent from the controller 6.

The PST involves, for example, gradually closing the regulating valve 3 from a state where the regulating valve 3 is fully open, that is, a state where the actual degree of opening of the regulating valve 3 is 100%, until the actual degree of opening reaches 90%, and then gradually opening the valve so as to change the actual degree of opening back to 100%. In this case, the PST executing unit 30 operates the regulating valve 3 by performing proportional-integral-derivative (PID) control (feedback control). Specifically, after an operating point is set by the operating-point searching unit 20, which will be described later, the PST executing unit 30 changes the target valve-opening value SP by using the operating point as an initial value, calculates an actually-measured valve-opening value PV of the regulating valve 3 based on a detection result SEN obtained by the valve-opening detector 17, generates an electric signal MV such that the actually-measured value PV matches the target valve-opening value SP, and executes the PST.

The storage unit 40 is a functional unit for storing programs for executing the PST and various types of parameters. For example, the storage unit 40 stores therein, for example, PST condition data 400 to be used when the above-described PST executing unit 30 executes the PST and containing information about the PST procedure and the rate of change of the valve opening when executing the PST, MV rate-of-change data 401 and Po-reference-value data 402 to be used in an operating-point searching process performed by the operating-point searching unit 20, which will be described later, and operating-point data 403 containing information about an operating point set by the operating-point searching unit 20.

The MV rate-of-change data 401 contains information about the rate of change of the electric signal MV (e.g., unit step $\rho 1$ and function $\rho(t)$, which will be described later) when the electric signal MV is changed for an operating-point searching process to be performed by the operating-point searching unit 20. The Po-reference-value data 402 contains information about the value of the output air pressure Po serving as a reference value (e.g., reference value Po_th, threshold value d_th, which will be described later) when the operating-point searching unit 20 sets an operating point.

The operating-point searching unit 20 is a functional unit that performs an operating-point searching process for setting an operating point of the regulating valve 3 in accordance with a PST execution command from the higher-level system 4. When the operating-point searching unit 20 receives the PST execution command from the higher-level system 4, the operating-point searching unit 20 generates an electric signal MV_OP and inputs the electric signal MV_OP to the electro-pneumatic converter 11 so as to search for an operating point. Specifically, the operating-point searching unit 20 changes the electric signal MV by performing open loop control so as to change the output air pressure Po of the output pneumatic signal So output from the electro-pneumatic converter 11, and sets the value of the electric signal MV when the output air pressure Po matches a predetermined reference value as an operating point. In other words, unlike the PST executing unit 30, the operating-point searching unit 20 does not perform feedback control for generating an electric signal MV such that the actually-measured valve-opening value (i.e., actual degree of opening) PV of the regulating valve 3 calculated based on the detection result SEN of the valve-opening detector 17 matches the set valve-opening value SP sent from the controller 6.

Figure 3:
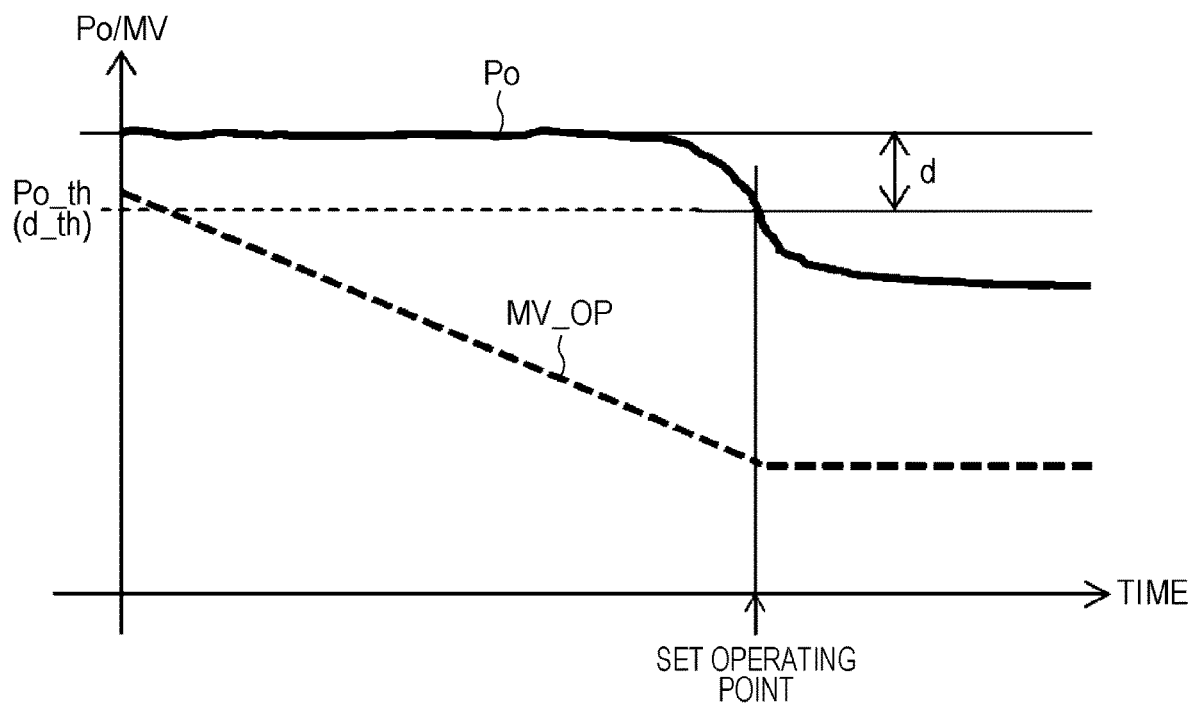
FIG. 3 illustrates an example of an operating-point searching process performed by the positioner according to the first embodiment.

FIG. 3 illustrates an example of the operating-point searching process performed by the positioner 1 according to the first embodiment.

For example, as shown in FIG. 3, when the operating-point searching unit 20 receives a PST execution command from the higher-level system 4, the operating-point searching unit 20 causes the electric signal MV_OP to be input to the electro-pneumatic converter 11 to decrease at a fixed rate of change (gradient) until the output air pressure Po of the output pneumatic signal So matches the predetermined reference value. Then, the electric signal MV_OP when the output air pressure Po of the output pneumatic signal So matches the predetermined reference value is set as the operating point, and the operating-point data 403 is stored into the storage unit 40.

As shown in FIG. 2, the operating-point searching unit 20 includes an electric-signal generating unit 21, an operating-point setting unit 22, and an output-air-pressure determining unit 23 as functional units for realizing the above-mentioned operating-point searching process.

For example, when a PST execution command is input from the higher-level system 4, the electric-signal generating unit 21 generates an electric signal MV_OP. Specifically, when the PST execution command is input, the electric-signal generating unit 21 generates an electric signal MV and also changes the magnitude of the electric signal MV at a predetermined rate of change in accordance with the MV rate-of-change data 401 stored in the storage unit 40.

The output-air-pressure determining unit 23 is a functional unit that determines whether or not the output air pressure Po detected by the pressure sensor 15 matches the predetermined reference value. Although the determination method by the output-air-pressure determining unit 23 is not particularly limited, the following are examples.

For example, when a PST execution command is input from the higher-level system 4, the output-air-pressure determining unit 23 may monitor the output air pressure Po detected by the pressure sensor 15 and, when the output air pressure Po matches the reference value Po_th based on the Po-reference-value data 402, the output-air-pressure determining unit 23 may output a signal indicating that the output air pressure Po matches the reference value Po_th. Alternatively, when a PST execution command is input from the higher-level system 4, the output-air-pressure determining unit 23 may store the current output air pressure Po as an initial value Po(0) and, when the output-air-pressure determining unit 23 detects that an amount of change d in the output air pressure Po relative to the initial value Po(0) has exceeded the threshold value d_th based on the Po-reference-value data 402, the output-air-pressure determining unit 23 may output a signal indicating that the amount of change d has exceeded the threshold value d_th.

In this embodiment, for example, it is assumed that the output-air-pressure determining unit 23 uses the latter determination method to determine whether or not the output air pressure Po matches the predetermined reference value.

When the output-air-pressure determining unit 23 determines that the output air pressure Po matches the predetermined reference value, the operating-point setting unit 22 sets the current value of the electric signal MV_OP as an operating point and stores the information about the operating point as the operating-point data 403 into the storage unit 40. The information stored as the operating-point data 403 into the storage unit 40 may be the value of the electric signal MV_OP or may be the target valve-opening value SP corresponding to that electric signal MV_OP.

Next, the flow of a PST process performed by the positioner 1 according to the first embodiment will be described.

Figure 4:
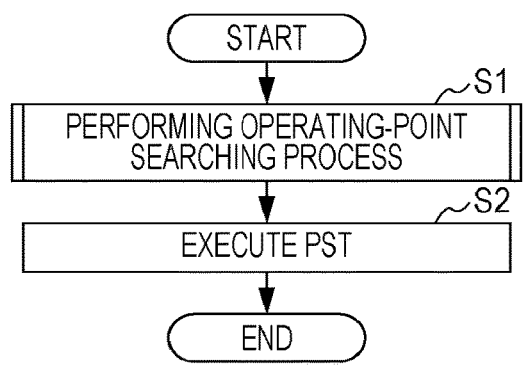
FIG. 4 is a flowchart illustrating the flow of a PST process performed by the positioner according to the first embodiment.

FIG. 4 is a flowchart illustrating the flow of the PST process performed by the positioner 1 according to the first embodiment.

First, for example, when a PST execution command is input from the higher-level system 4, the positioner 1 executes the operating-point searching process so as to set an operating point in step S1.

Then, when the operating point is set in step S1, the positioner 1 uses the operating point to execute the PST in step S2. Specifically, as described above, the PST executing unit 30 of the positioner 1 changes the target valve-opening value SP using the operating point set in step S1 as an initial value, calculates the actually-measured valve-opening value PV of the regulating valve 3 based on the detection result SEN obtained by the valve-opening detector 17, generates an electric signal MV such that the actually-measured value PV matches the target valve-opening value SP, and performs the PST.

In accordance with the above procedure, the PST is executed as a test on the regulating valve 3.

Next, the flow of the operating-point searching process (step S1) will be described. The following description relates to an example where an operating point is searched by decreasing the electric signal MV_OP at a fixed rate of change, as shown in FIG. 3.

Figure 5:
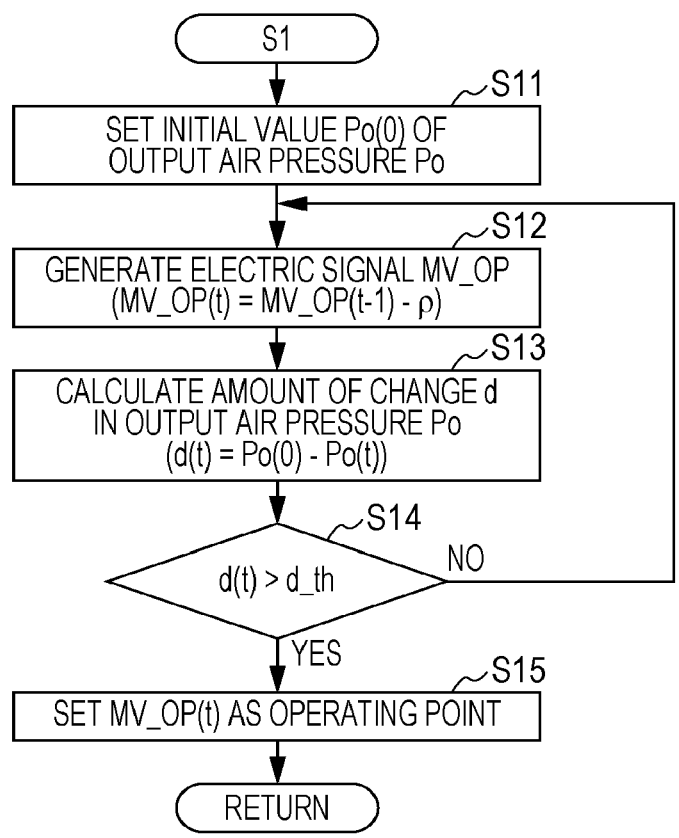
FIG. 5 is a flowchart illustrating the flow of the operating-point searching process (step S1) performed by the positioner according to the first embodiment.

FIG. 5 is a flowchart illustrating the flow of the operating-point searching process (step S1) performed by the positioner 1 according to the first embodiment.

When the positioner 1 receives the PST execution command from the higher-level system 4, the output-air-pressure determining unit 23 in the positioner 1 first stores the current value of the output air pressure Po as an initial output-air-pressure value Po(0) into the storage unit 40 in step S11.

Then, the electric-signal generating unit 21 generates an electric signal MV_OP in step S12. Specifically, the electric-signal generating unit 21 sends a value obtained by subtracting a unit step ρ from a preceding value (MV_OP(t−1)) of the electric signal MV_OP as an electric signal MV_OP(t) to the electro-pneumatic converter 11.

In step S13, the output-air-pressure determining unit 23 calculates an amount of change d(t) in the output air pressure Po. Specifically, the amount of change d(t) in the output air pressure Po is calculated by subtracting a current value Po(t) of the output air pressure Po from the initial value Po(0) stored in the storage unit 40 in step S11.

In step S14, the output-air-pressure determining unit 23 determines whether or not the amount of change d(t) in the output air pressure Po calculated in step S13 exceeds the threshold value d_th. If the amount of change d(t) in the output air pressure Po does not exceed the threshold value d_th in step S14, the process returns to step S12. Then, the process from step S12 to step S14 is repeated until the amount of change d(t) in the output air pressure Po exceeds the threshold value d_th.

If the amount of change d(t) in the output air pressure Po exceeds the threshold value d_th in step S14, the output-air-pressure determining unit 23 outputs a signal indicating that the amount of change d(t) has exceeded the threshold value d_th, and the operating-point setting unit 22 receiving the signal sets the current electric signal MV_OP(t) as an operating point in step S15. In this case, as described above, the operating-point setting unit 22 stores the information about the set operating point as the operating-point data 403 into the storage unit 40. In accordance with the above process, the operating point of the positioner 1 can be found.

With the positioner 1 according to the first embodiment, the operating point of the positioner 1 can be ascertained prior to executing the PST on a regulating valve, such as an emergency valve. Thus, when executing the PST, the found operating point may be set as an initial valve-opening value so that even if the operating point is deviated from a designed value due to, for example, aging degradation, the output air pressure Po of the emergency shutoff valve set to the initial value can be prevented from changing rapidly from the maximum value (i.e., actual degree of opening of 100%) to the minimum value (i.e., actual degree of opening of 0%).

Furthermore, in the positioner 1, the electric signal MV (i.e., target valve-opening value) is changed at a predetermined rate of change by performing open loop control, and the operating point is set based on the value of the electric signal MV when the output air pressure Po reaches a predetermined reference value. Thus, the time spent on the PST can be shortened, as compared with a case where the PST is executed by gradually decreasing the target valve-opening value from 100% by performing feedback control as in the related art.

Therefore, with the positioner 1 according to the first embodiment, the PST can be performed safely and efficiently.

Figure 6:
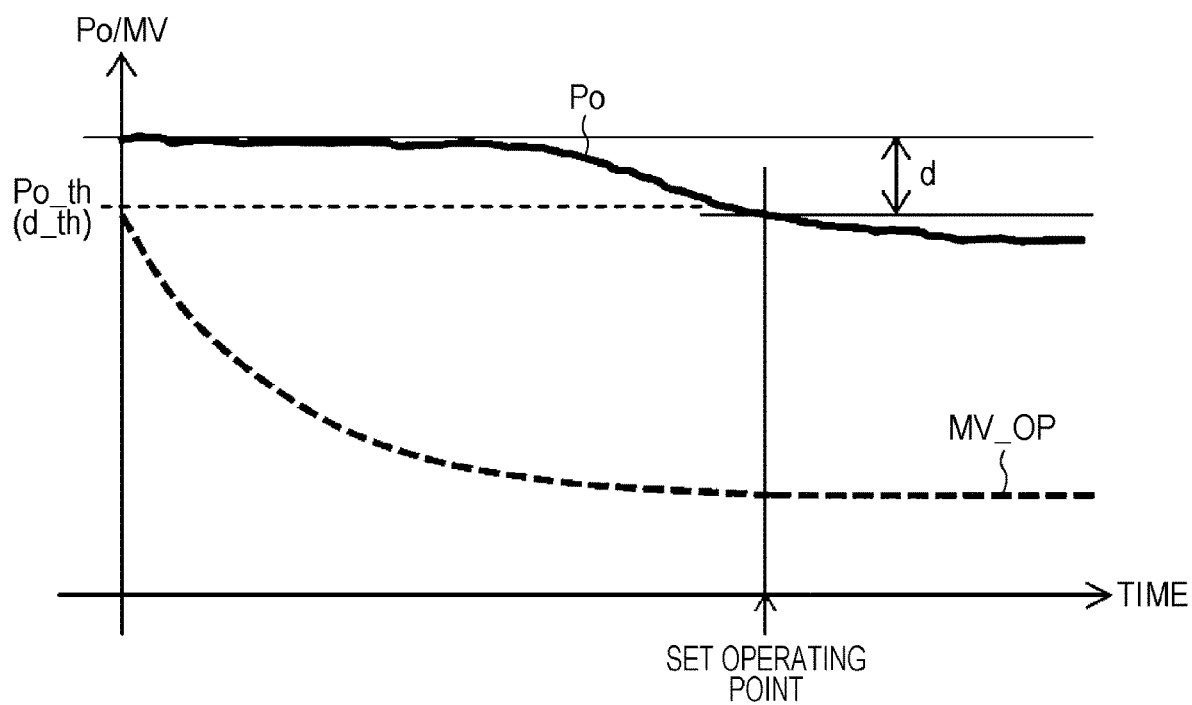
FIG. 6 illustrates another example of the operating-point searching process performed by the positioner according to the first embodiment.
Figure 7:
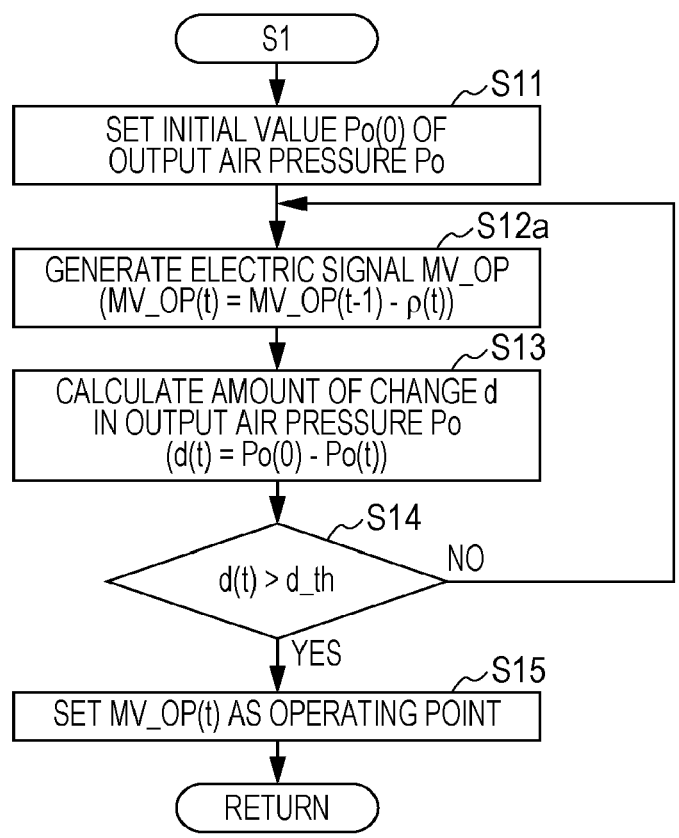
FIG. 7 is a flowchart illustrating the flow of another example of the operating-point searching process (step S1) performed by the positioner according to the first embodiment.

Although the first embodiment relates to an example where an operating point is searched by changing the electric signal MV_OP at a fixed rate of change (gradient) (see FIG. 3), an operating point may alternatively be searched by changing the electric signal MV_OP such that the rate of change of the electric signal MV_OP gradually decreases, as shown in FIG. 6. As shown in FIG. 7, the overall flow of the process in this case is similar to the flow of the process (FIG. 5) in the case where the above-described electric signal MV_OP is changed at a fixed rate of change, but only differs therefrom in terms of the step (S12) for generating the electric signal MV_OP. Specifically, as indicated in step S12a in FIG. 7, the electric-signal generating unit 21 sends a value obtained by subtracting a function $\rho(t)$ from a preceding value (MV_OP(t−1)) of the electric signal MV_OP as an electric signal MV_OP(t) to the electro-pneumatic converter 11. The parameter of the function $\rho(t)$ is the information stored as the MV rate-of-change data 401 in the storage unit 40 and may be arbitrarily set so that a desired rate of change can be obtained with respect to the electric signal MV_OP.

Second Embodiment

Figure 8:
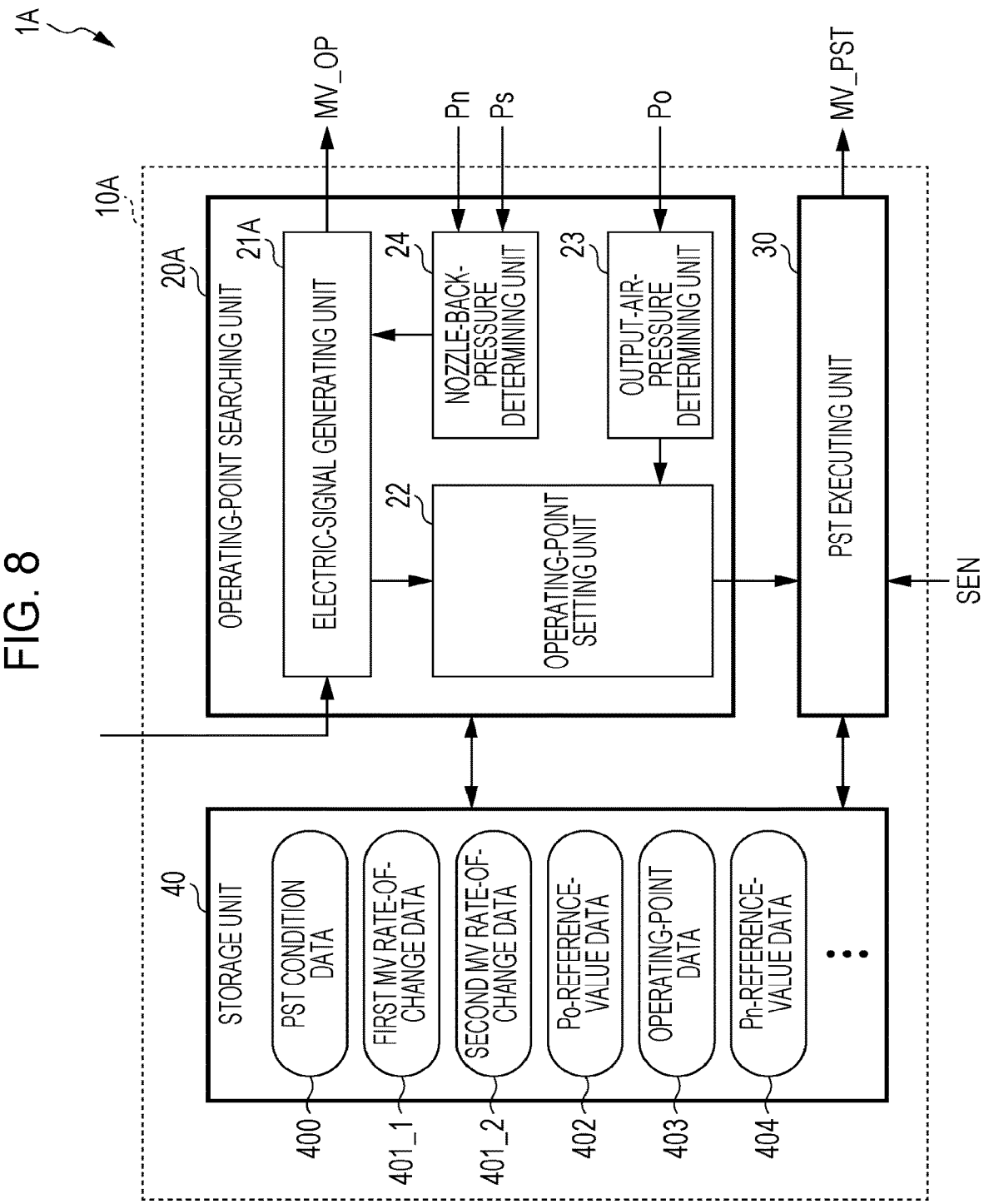
FIG. 8 illustrates the configuration of a data processing controller of a positioner according to a second embodiment.

FIG. 8 illustrates the configuration of a data processing controller 10A of a positioner 1A according to a second embodiment.

The data processing controller 10A of the positioner 1A according to the second embodiment differs from the data processing controller 10 of the positioner 1 according to the first embodiment in that the rate of change of the electric signal MV_OP to be input to the electro-pneumatic converter 11 is divided into a plurality of levels when searching for an operating point. Other points are the same as those in the positioner 1 according to the first embodiment.

FIG. 8 only illustrates the configuration of the data processing controller 10A, which is different from that in the positioner 1 according to the first embodiment, in the positioner 1A according to the second embodiment, and other functional units that are identical to those of the positioner 1 according to the first embodiment are not illustrated.

Figure 9:
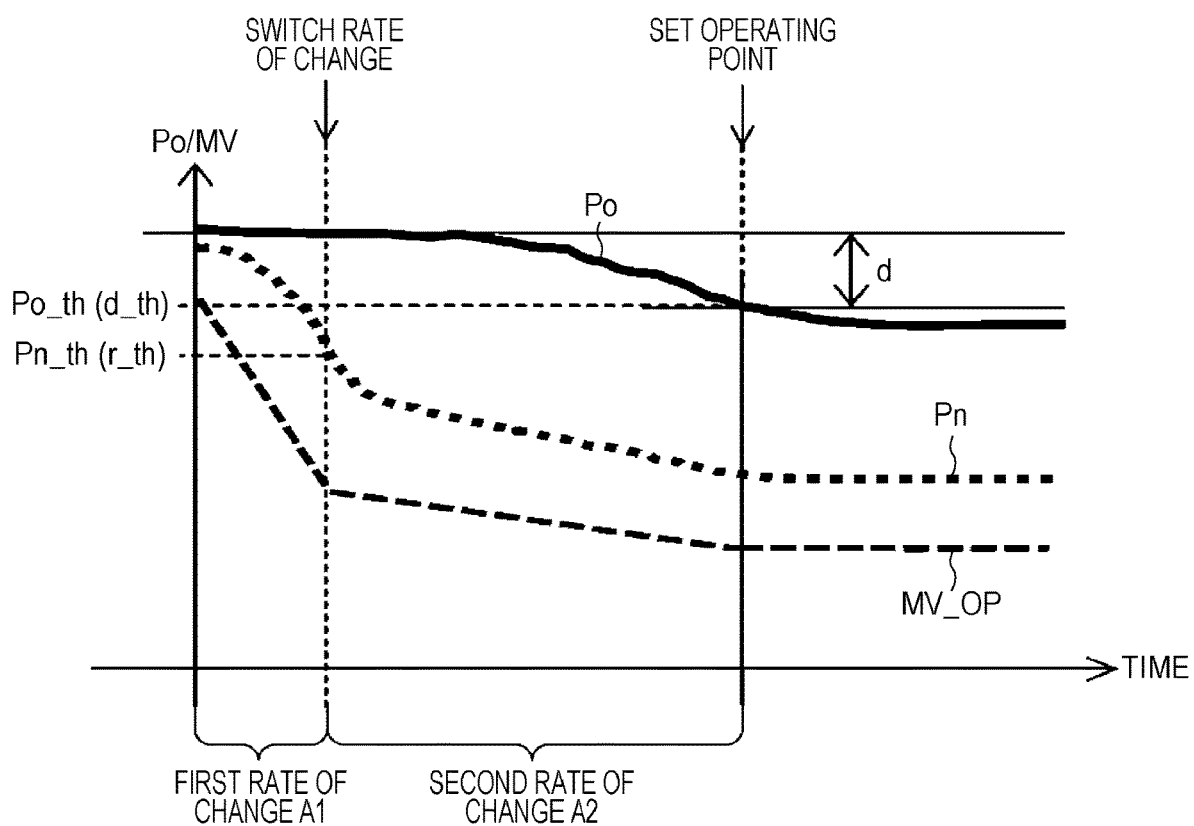
FIG. 9 illustrates an example of an operating-point searching process performed by the positioner according to the second embodiment.

FIG. 9 illustrates an example of an operating-point searching process performed by the positioner 1A according to the second embodiment.

For example, as shown in FIG. 9, the data processing controller 10A of the positioner 1A according to the second embodiment first changes the electric signal MV_OP, which is to be input to the electro-pneumatic converter 11, at a first rate of change A1. When the nozzle back pressure Pn matches a predetermined reference value, the data processing controller 10A changes the electric signal MV_OP at a second rate of change A2, which is smaller than the first rate of change A1, until the output air pressure Po matches a predetermined reference value. Then, the electric signal MV_OP when the output air pressure Po matches the predetermined reference value is set as the operating point and is stored as the operating-point data 403 into the storage unit 40.

Specifically, as shown in FIG. 8, the data processing controller 10A has an operating-point searching unit 20A that includes an electric-signal generating unit 21A, an operating-point setting unit 22, an output-air-pressure determining unit 23, and a nozzle-back-pressure determining unit 24. In the data processing controller 10A, components similar to those of the data processing controller 10 of the positioner 1 according to the first embodiment are given the same reference signs, and detailed descriptions thereof are omitted.

The nozzle-back-pressure determining unit 24 is a functional unit that determines whether or not the nozzle back pressure Pn detected by the pressure sensor 14 matches a predetermined reference value. Although the determination method by the nozzle-back-pressure determining unit 24 is not particularly limited, the following are examples.

For example, when a PST execution command is input from the higher-level system 4, the nozzle-back-pressure determining unit 24 may monitor the nozzle back pressure Pn detected by the pressure sensor 14 and, when the nozzle back pressure Pn matches a reference value Pn_th based on Pn-reference-value data 404, the nozzle-back-pressure determining unit 24 may output a signal indicating that the nozzle back pressure Pn matches the reference value Pn_th.

Alternatively, for example, when a PST execution command is input from the higher-level system 4, the nozzle-back-pressure determining unit 24 may monitor the nozzle back pressure Pn detected by the pressure sensor 14 and the supplied air pressure Ps detected by the pressure sensor 16 and calculate an amount of change r (=Pn/Ps) of the nozzle back pressure Pn relative to the supplied air pressure Ps. Then, when the nozzle-back-pressure determining unit 24 detects that the amount of change r in the nozzle back pressure Pn exceeds a threshold value r_th based on the Pn-reference-value data 404 stored in the storage unit 40, the nozzle-back-pressure determining unit 24 may output a signal indicating that the amount of change r has exceeded the threshold value r_th.

The Pn-reference-value data 404 contains information about the value of the nozzle back pressure Pn serving as a reference value (e.g., reference value Pn_th, threshold value r_th, which will be described later) when the operating-point searching unit 20A sets an operating point, and is stored in the storage unit 40, similar to the Po-reference-value data 402.

In this embodiment, for example, it is assumed that the nozzle-back-pressure determining unit 24 uses the latter determination method to determine whether or not the nozzle back pressure Pn matches the predetermined reference value.

For example, when a PST execution command is input from the higher-level system 4, the electric-signal generating unit 21A generates an electric signal MV_OP. Specifically, when a PST execution command is received, the electric-signal generating unit 21A generates an electric signal MV and also changes the magnitude of the electric signal MV at a first rate of change in accordance with first MV rate-of-change data 401_1 stored in the storage unit 40. Then, when the nozzle-back-pressure determining unit 24 detects that the nozzle back pressure Pn matches the predetermined reference value, the electric-signal generating unit 21A changes the magnitude of the electric signal MV at a second rate of change in accordance with second MV rate-of-change data 401_2 stored in the storage unit 40.

Similar to the above-described MV rate-of-change data 401, the first MV rate-of-change data 401_1 and the second MV rate-of-change data 401_2 each contain information (e.g., unit step $\rho1$, unit step $\rho2$, which will be described later) indicating the rate of change of the electric signal MV_OP when changing the electric signal MV_OP in the operating-point searching process. The second rate of change A2 of the electric signal MV_OP based on the second MV rate-of-change data 401_2 is smaller than the first rate of change A1 of the electric signal MV_OP based on the first MV rate-of-change data 401_1 (A2<A1).

Next, the flow of the operating-point searching process in step S1 will be described. The following description relates to an example where an operating point is searched by dividing and changing the electric signal MV_OP into two levels, as shown in FIG. 9.

Figure 10:
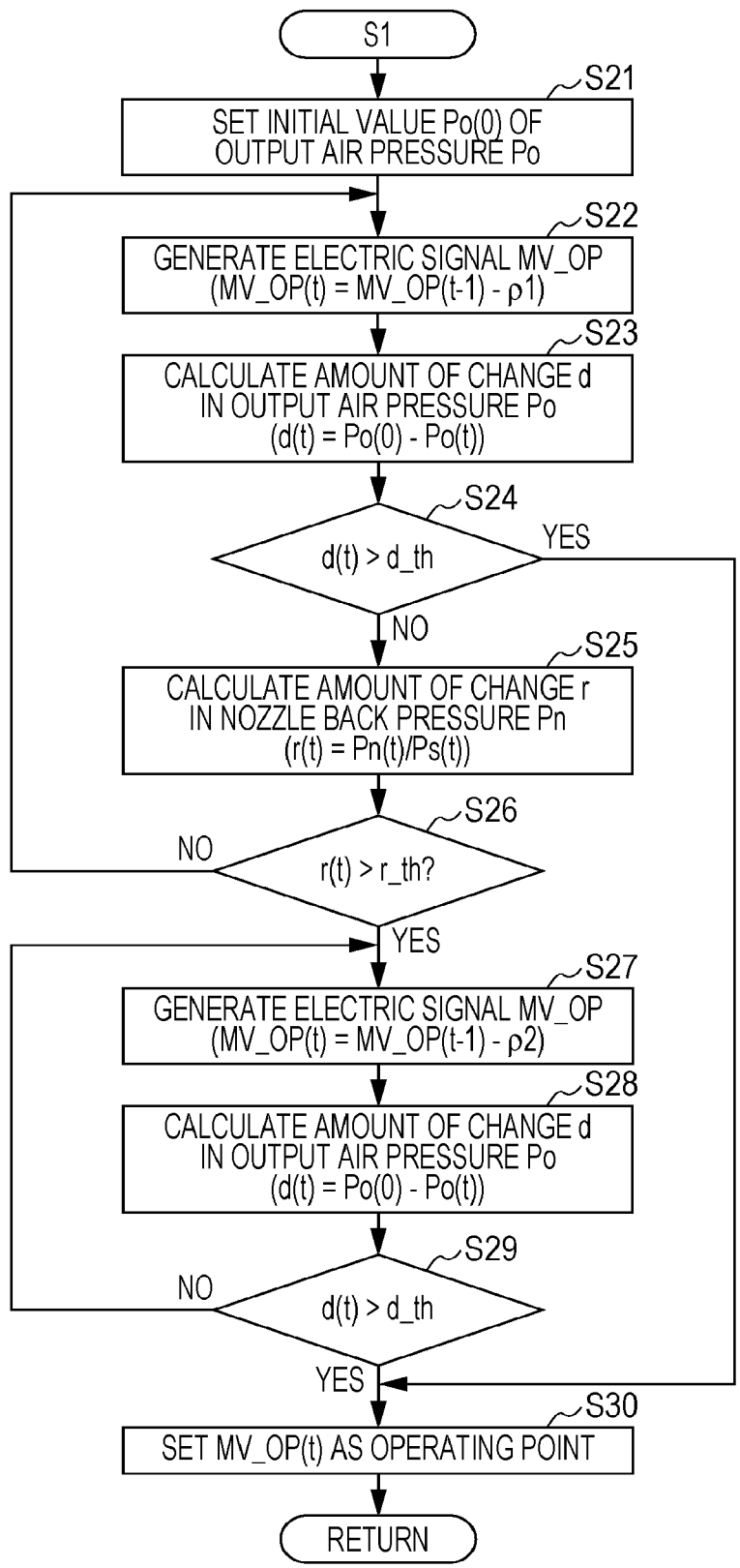
FIG. 10 is a flowchart illustrating the flow of the operating-point searching process (step S1) performed by the positioner according to the second embodiment.

FIG. 10 is a flowchart illustrating the flow of the operating-point searching process performed by the positioner 1A according to the second embodiment.

When the positioner 1A receives the PST execution command, the output-air-pressure determining unit 23 first stores the current value of the output air pressure Po as an initial output-air-pressure value Po(0) into the storage unit 40 in step S21.

Then, in step S22, the electric-signal generating unit 21A generates an electric signal MV_OP. In this case, the electric-signal generating unit 21A generates the electric signal MV_OP by performing open loop control. Specifically, as shown in FIG. 9, the electric-signal generating unit 21A reads the first MV rate-of-change data 401_1 from the storage unit 40 and generates the electric signal MV_OP by performing open loop control in accordance with the first MV rate-of-change data 401_1. For example, the electric-signal generating unit 21A sends a value obtained by subtracting the unit step $\rho1$ based on the first MV rate-of-change data 401_1 from a preceding value (MV_OP(t−1)) of the electric signal MV_OP as an electric signal MV_OP(t) to the electro-pneumatic converter 11.

In step S23, the output-air-pressure determining unit 23 calculates an amount of change d(t) in the output air pressure Po. Specifically, the amount of change d(t) in the output air pressure Po is calculated by subtracting a current value Po(t) of the output air pressure Po from the initial value Po(0) stored in the storage unit 40 in step S21.

In step S24, the output-air-pressure determining unit 23 determines whether or not the amount of change d(t) in the output air pressure Po calculated in step S23 exceeds the threshold value d_th based on the Po-reference-value data 402 stored in the storage unit 40. If the amount of change d(t) in the output air pressure Po exceeds the threshold value d_th in step S24, the output-air-pressure determining unit 23 outputs a signal indicating that the amount of change d(t) has exceeded the threshold value d_th, and the operating-point setting unit 22 receiving the signal sets the current electric signal MV_OP(t) as an operating point in step S30. In this case, as described above, the operating-point setting unit 22 stores the information about the set operating point as the operating-point data 403 into the storage unit 40.

If the amount of change d(t) in the output air pressure Po does not exceed the threshold value d_th in step S24, the nozzle-back-pressure determining unit 24 calculates an amount of change r(t) (=Pn(t)/Ps(t)) in the nozzle back pressure Pn relative to the supplied air pressure Ps in step S25.

In step S26, the nozzle-back-pressure determining unit 24 determines whether or not the amount of change r(t) in the nozzle back pressure Pn calculated in step S25 exceeds the threshold value r_th based on the Pn-reference-value data 404 stored in the storage unit 40. If the amount of change r(t) in the nozzle back pressure Pn does not exceed the threshold value r_th in step S26, the process returns to step S22. Then, the process from step S22 to step S26 is repeated until the amount of change r(t) in the nozzle back pressure Pn exceeds the threshold value r_th.

If the amount of change r(t) in the nozzle back pressure Pn exceeds the threshold value r_th in step S26, the nozzle-back-pressure determining unit 24 outputs a signal indicating that the amount of change r(t) has exceeded the threshold value r_th, and the electric-signal generating unit 21 receiving the signal changes the rate of change of the electric signal MV_OP in step S27. For example, the electric-signal generating unit 21A sends a value obtained by subtracting the unit step $\rho2$ ($<\rho1$) based on the second MV rate-of-change data 401_2 from a preceding value (MV_OP(t−1)) of the electric signal MV_OP as an electric signal MV_OP(t) to the electro-pneumatic converter 11.

In step S28, the output-air-pressure determining unit 23 calculates an amount of change d(t) in the output air pressure Po. The calculation method is the same as that in step S23.

In step S29, the output-air-pressure determining unit 23 determines whether or not the amount of change d(t) in the output air pressure Po calculated in step S28 exceeds the threshold value d_th based on the Po-reference-value data 402 stored in the storage unit 40. If the amount of change d(t) in the output air pressure Po does not exceed the threshold value d_th in step S29, the process returns to step S27. Then, the process from step S27 to step S29 is repeated until the amount of change d(t) in the output air pressure Po exceeds the threshold value d_th.

If the amount of change d(t) in the output air pressure Po exceeds the threshold value d_th in step S29, the output-air-pressure determining unit 23 outputs a signal indicating that the amount of change d(t) has exceeded the threshold value d_th, and the operating-point setting unit 22 receiving the signal sets the current electric signal MV_OP(t) as an operating point in step S30. In this case, as described above, the operating-point setting unit 22 stores the information about the set operating point as the operating-point data 403 into the storage unit 40.

In accordance with the above process, the operating point of the positioner 1A can be found.

The positioner 1A according to the second embodiment is similar to the positioner 1 according to the first embodiment in that the operating point of the positioner 1A can be ascertained prior to executing the PST on the regulating valve 3, such as an emergency valve, whereby the PST can be performed safely and efficiently.

Furthermore, in the positioner 1A according to the second embodiment, the operating-point searching process involves changing the electric signal MV_OP at the first rate of change A1 until the nozzle back pressure Pn exceeds the predetermined reference value and then changing the electric signal MV_OP at the second rate of change A2, which is smaller than the first rate of change A1, after the nozzle back pressure Pn exceeds the predetermined reference value, whereby the time it takes to find the operating point can be shortened. For example, by setting the reference value (Pn_th, r_th) for the nozzle back pressure Pn to the value of the nozzle back pressure Pn immediately before the output air pressure Po starts to change, the electric signal MV can be changed at high speed until the output air pressure Po starts to change.

Furthermore, as described above, the input-output characteristic (Pn-Po characteristic) of the pneumatic amplifier 13 (pilot relay unit) of the electro-pneumatic converter 11 has a smaller deviation from a designed value due to, for example, aging degradation, as compared with the input-output characteristic (MV-Pn characteristic) of the nozzle flapper 12. Therefore, even if the reference value (Pn_th, r_th) for the nozzle back pressure Pn is set based on the designed value of the Pn-Po characteristic, there is a low possibility that the output air pressure Po may change rapidly when the electric signal MV is changed at high speed.

Therefore, with the positioner 1A according to the second embodiment, the operating-point searching process can be performed more safely within a shorter period of time.

Third Embodiment

Figure 11:
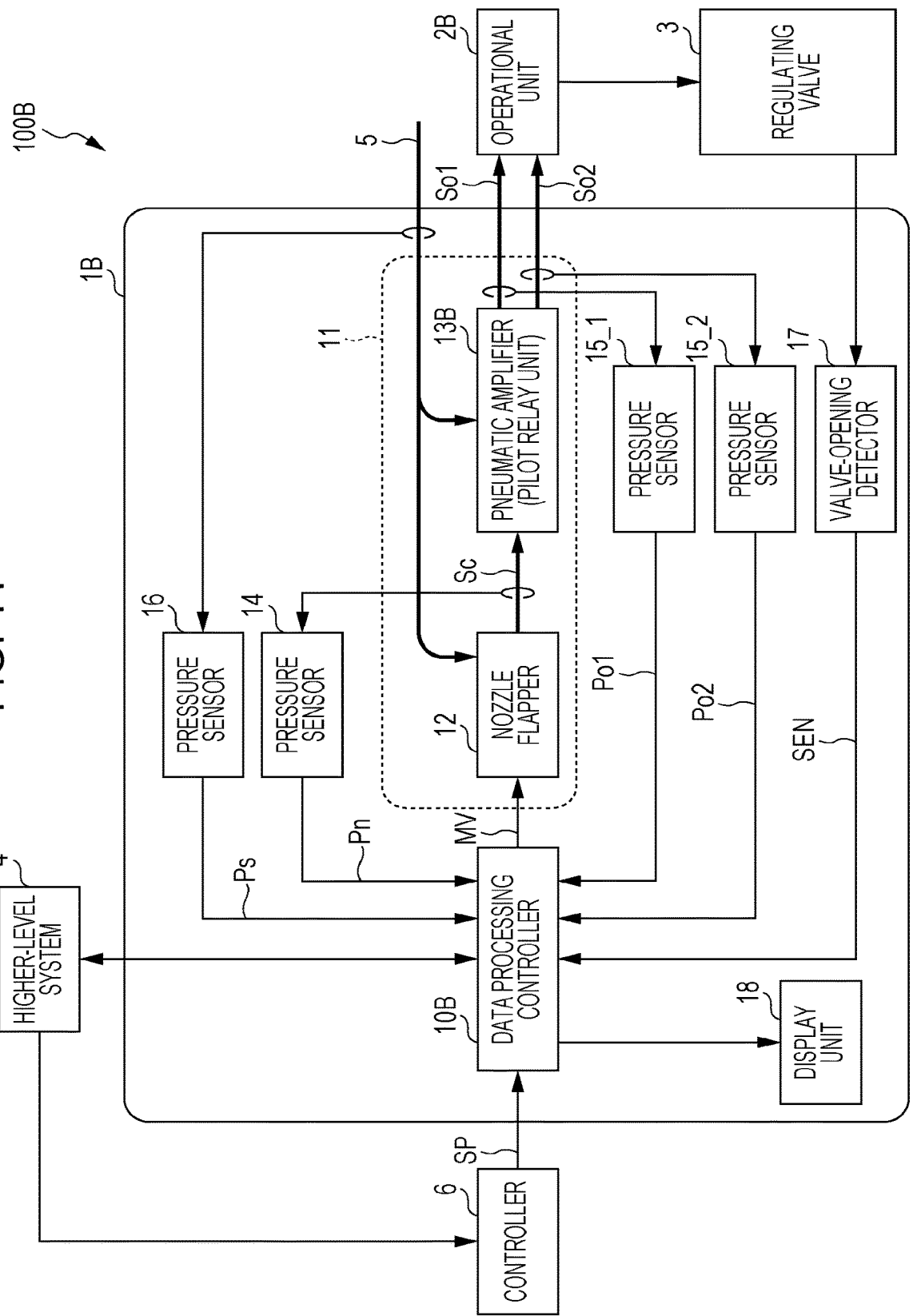
FIG. 11 illustrates the configuration of a valve control system including a positioner according to a third embodiment.

FIG. 11 illustrates the configuration of a valve control system 100B including a positioner 1B according to a third embodiment.

The positioner 1B according to the third embodiment differs from the positioner 1A according to the second embodiment in that it is a double-action positioner that drives a double-action operational unit 2B having a structure in which the operational amount of the valve shaft of the regulating valve 3 is set in accordance with a pressure difference between two input pneumatic signals. In the positioner 1B according to the third embodiment, components similar to those of the positioner 1A according to the second embodiment are given the same reference signs, and detailed descriptions thereof are omitted.

Specifically, the positioner 1B according to the third embodiment further includes pressure sensors 15_1 and 15_2 that respectively detect output air pressures Po1 and Po2 of a pair of output pneumatic signals So1 and So2 output from a pneumatic amplifier 13B for driving the operational unit 2B.

Figure 12:
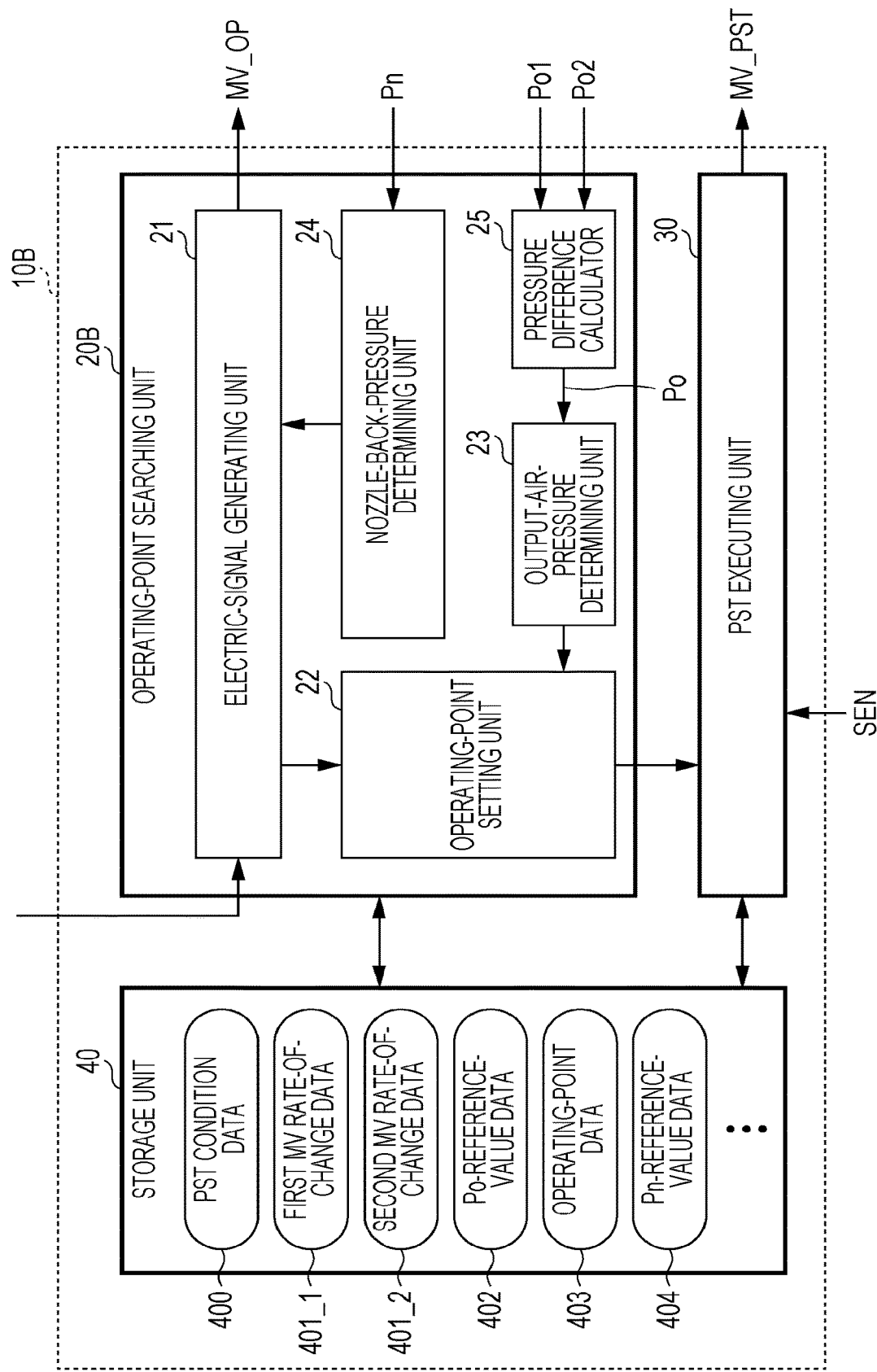
FIG. 12 illustrates the configuration of a data processing controller of the positioner according to the third embodiment.
Figure 13:
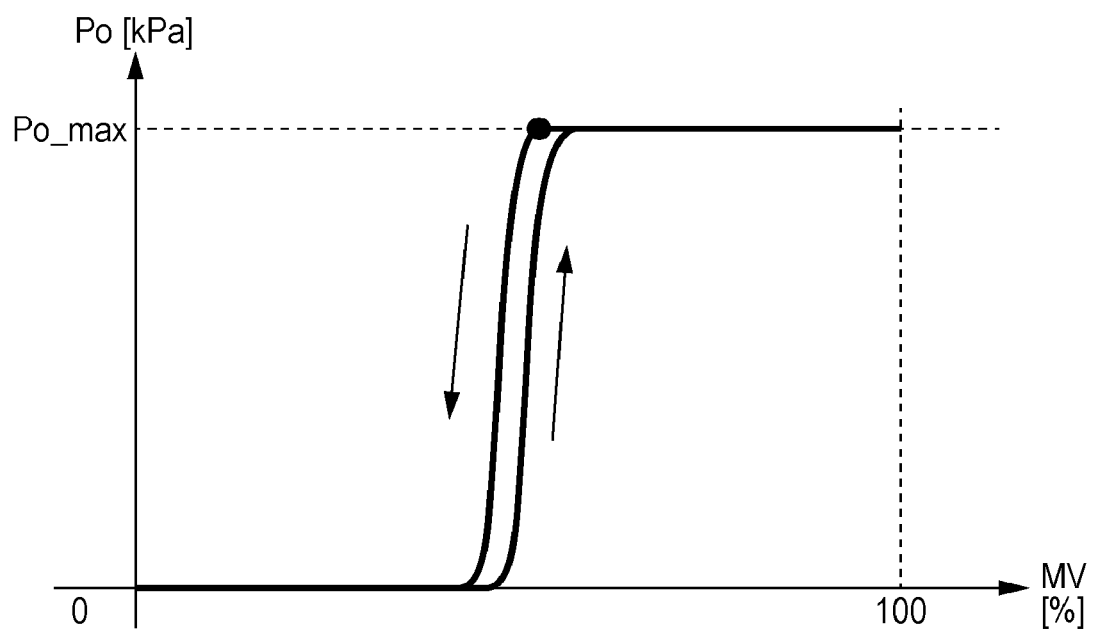
FIG. 13 illustrates an example of an input-output characteristic (MV-Po characteristic) of an electro-pneumatic converter in a positioner in the related art.
Figure 14:
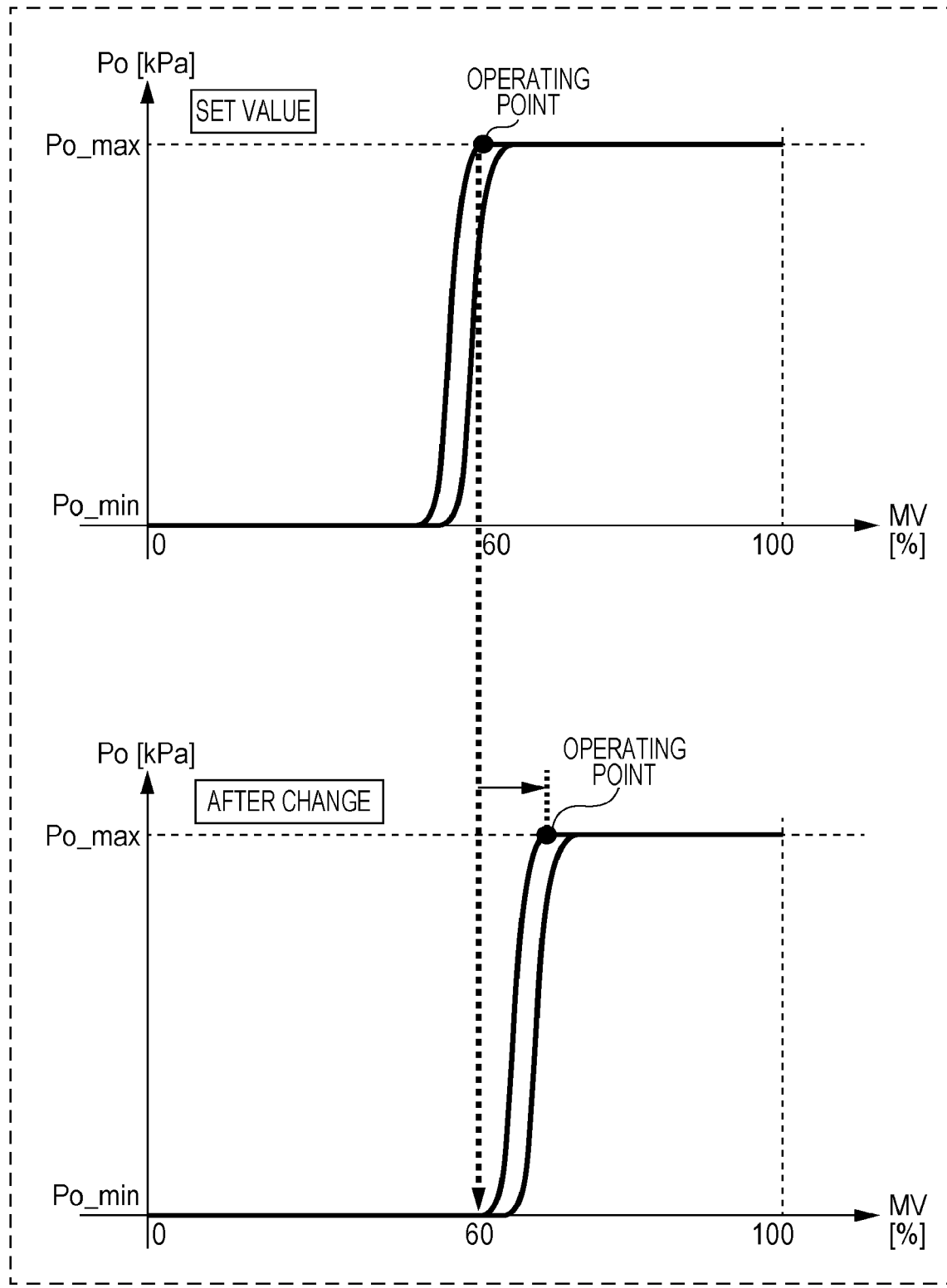
FIG. 14 illustrates an example where the input-output characteristic (MV-Po characteristic) of the electro-pneumatic converter in the positioner in the related art is deviated from a designed value.

FIG. 12 illustrates an internal configuration of a data processing controller 10B of the positioner 1B according to the third embodiment.

In the data processing controller 10B of the positioner 1B according to the third embodiment, an operating-point searching unit 20B further has a pressure difference calculator 25. The pressure difference calculator 25 calculates a pressure difference between the output air pressure Po1 and the output air pressure Po2. The pressure difference calculated by the pressure difference calculator 25 is input as an output air pressure Po to the output-air-pressure determining unit 23 so as to be used for the operating-point searching process, as in the positioner 1A according to the second embodiment.

With the double-action positioner 1B according to the third embodiment, the PST can be performed safely and efficiently, as in the single-action positioners 1 and 1A according to the first and second embodiments.

Although the present invention by the present inventors has been described above in detail based on the embodiments, the present invention is not limited to these embodiments, and various modifications are possible so long as they do not depart from the spirit of the invention.

For example, in each of the above embodiments, the electro-pneumatic converter 11 is not limited to the above-described configuration (see FIG. 1) so long as it is capable of generating the pneumatic signal Sc and the output pneumatic signal So.

Furthermore, as an alternative to the second embodiment in which the linear rate of change of the electric signal MV is changed in two levels, for example, the operating-point searching process may involve changing the electric signal MV_OP in a quadratic manner such that the rate of change decreases gradually as in FIG. 6 until the nozzle back pressure Pn(t) matches the reference value Pn_th (r_th), and then changing the electric signal MV_OP in a linear manner when the nozzle back pressure Pn(t) matches the reference value Pn_th (r_th).

Furthermore, although the third embodiment relates to the example where the functional units (i.e., the pneumatic amplifier 13B, the pressure sensors 15_1 and 15_2, and the pressure difference calculator 25) for driving the double-action operational unit 2B are incorporated in the positioner 1A according to the second embodiment, the functional units for driving the double-action operational unit 2B may alternatively be incorporated in the positioner 1 according to the first embodiment.

What is claimed is:

1. A positioner, comprising:
an electro-pneumatic converter configured to convert an input electric signal into a pneumatic signal and to control a valve opening of a regulating valve by driving an actuator in accordance with the pneumatic signal; and
processing circuitry configured to
sequentially change the electric signal by performing open loop control so as to search for and find an operating point indicating an input value of the electro-pneumatic converter when an output air pressure of the pneumatic signal starts to change from a maximum or minimum state, and
execute a partial stroke test on the regulating valve by using the found operating point,
wherein the processing circuitry is further configured to, as part of performing the open loop control in which the electric signal is sequentially changed, determine whether the output air pressure matches a first predetermined reference value, and set the operating point based on a value of the electric signal when the output air pressure matches the first predetermined reference value.

2. The positioner according to claim 1, wherein the processing circuitry is further configured to change the electric signal at a fixed rate of change.

3. The positioner according to claim 2, further comprising:
a first pressure sensor configured to detect the output air pressure,
wherein the processing circuitry is further configured to generate the electric signal, determine whether or not the output air pressure matches the first predetermined reference value, and set the operating point based on a current value of the electric signal when determining that the output air pressure matches the first predetermined reference value.

4. The positioner according to claim 3, wherein
the electro-pneumatic converter generates a pair of pneumatic signals for driving the actuator for double action,
the first pressure sensor detects air pressures of the pair of pneumatic signals, and
the processing circuitry is further configured to calculate a pressure difference of the pair of pneumatic signals detected by the first pressure sensor, and set the calculated pressure difference as the output air pressure.

5. The positioner according to claim 1, wherein the processing circuitry is further configured to gradually decrease a rate of change of the electric signal.

6. The positioner according to claim 1, wherein
the electro-pneumatic converter includes a nozzle flapper, and
the processing circuitry is further configured to change the electric signal at a first rate of change and then change the electric signal at a second rate of change, which is smaller than the first rate of change, when a nozzle back pressure of the nozzle flapper matches a second predetermined reference value.

7. The positioner according to claim 6, further comprising:
a first pressure sensor configured to detect the output air pressure; and
a second pressure sensor configured to detect the nozzle back pressure,
wherein the processing circuitry is further configured to
generate the electric signal,
determine whether or not the output air pressure detected by the first pressure sensor matches the first predetermined reference value,
determine whether or not the nozzle back pressure detected by the second pressure sensor matches the second predetermined reference value, and
set the operating point based on a current value of the electric signal when determining that the output air pressure matches the first predetermined reference value, and
wherein the processing circuitry is further configured to change the electric signal at the second rate of change when determining that the nozzle back pressure matches the second predetermined reference value when the electric signal is changed at the first rate of change.

8. The positioner of claim 1, wherein the processing circuitry is further configured to sequentially decrease a value of the electric signal so as to sequentially decrease the output air pressure before setting the operating point.

9. The positioner of claim 1, wherein the processing circuitry is further configured to monotonically decrease the value of the electric signal before setting the operating point.

* * * * *